(12) United States Patent
Kroll et al.

(10) Patent No.: US 8,974,713 B2
(45) Date of Patent: Mar. 10, 2015

(54) METHOD AND APPARATUS FOR PRODUCING PLASTIC PRODUCTS WITH INTEGRATED REINFORCING STRUCTURE

(75) Inventors: Lothar Kroll, Dresden (DE); Wolfgang Nendel, Oederan (DE); Frank Helbig, Göpfersdorf (DE); Karl-Heinz Hoyer, Markneukirchen (DE); Tino Zucker, Mildenau (DE); Martin Würtele, Friedberg (DE)

(73) Assignee: KraussMaffei Technologies GmbH, München (DE)

( * ) Notice: Subject to any disclaimer, the term of this patent is extended or adjusted under 35 U.S.C. 154(b) by 582 days.

(21) Appl. No.: 13/062,839

(22) PCT Filed: Sep. 7, 2009

(86) PCT No.: PCT/EP2009/061562
§ 371 (c)(1),
(2), (4) Date: Mar. 8, 2011

(87) PCT Pub. No.: WO2010/031710
PCT Pub. Date: Mar. 25, 2010

(65) Prior Publication Data
US 2011/0175254 A1    Jul. 21, 2011

(30) Foreign Application Priority Data
Sep. 16, 2008 (DE) .................. 10 2008 047 564

(51) Int. Cl.
*B29C 45/14* (2006.01)
*B29C 47/02* (2006.01)
*B29C 45/16* (2006.01)
*B29C 67/24* (2006.01)
*B29K 75/00* (2006.01)

(52) U.S. Cl.
CPC ....... *B29C 45/1671* (2013.01); *B29C 45/14008* (2013.01); *B29C 45/14065* (2013.01); *B29C 45/1628* (2013.01); *B29C 45/1679* (2013.01); *B29C 67/246* (2013.01); *B29C 2045/14114* (2013.01); *B29C 2045/14155* (2013.01); *B29C 2045/1685* (2013.01); *B29K 2075/00* (2013.01); *B29K 2713/00* (2013.01)
USPC ...... 264/257; 264/328.18; 264/294; 264/255; 425/112; 425/573

(58) Field of Classification Search
USPC ............... 264/294, 255, 328.11, 328.18, 257; 425/110, 112, 573, 518
See application file for complete search history.

(56) References Cited

U.S. PATENT DOCUMENTS 4,734,023 A * 3/1988 Nesch et al. .................. 425/130
6,630,090 B1 * 10/2003 Nagaoka ....................... 264/255

(Continued)

FOREIGN PATENT DOCUMENTS

DE     41 24 297 A1    1/1993
DE     43 01 444 A1    7/1994

(Continued)

*Primary Examiner* — Matthew Daniels
*Assistant Examiner* — Nahida Sultana
(74) *Attorney, Agent, or Firm* — Henry M. Feiereisen LLC

(57) ABSTRACT

The present invention relates to a method and to an apparatus for producing plastic products with an integrated reinforcing structure. To do so, a flexible fabric is first placed onto a surface of a cavity of a mold and is successively coated with plastic on the various sides.

7 Claims, 10 Drawing Sheets

(56) References Cited

U.S. PATENT DOCUMENTS

| | | | |
|---|---|---|---|
| 6,824,381 B2* | 11/2004 | Wohlrab | 425/574 |
| 7,875,224 B2* | 1/2011 | Gruber | 264/250 |
| 8,632,330 B2* | 1/2014 | Jones et al. | 425/356 |
| 8,684,721 B2* | 4/2014 | Coleman et al. | 425/405.1 |
| 8,691,137 B2* | 4/2014 | Prebil et al. | 264/324 |
| 8,758,666 B2* | 6/2014 | Epshetsky | 264/328.11 |
| 8,840,819 B2* | 9/2014 | Roberts, Jr. | 264/45.4 |
| 2002/0106952 A1* | 8/2002 | Hashizume et al. | 442/43 |
| 2003/0165706 A1* | 9/2003 | Abbott et al. | 428/577 |
| 2003/0170460 A1* | 9/2003 | Sienkiewicz et al. | 428/411.1 |
| 2004/0018337 A1 | 1/2004 | Hus et al. | |
| 2005/0156352 A1 | 7/2005 | Burkle et al. | |
| 2006/0003172 A1 | 1/2006 | Scherer et al. | |
| 2007/0096364 A1* | 5/2007 | Hahn et al. | 264/255 |
| 2007/0141353 A1* | 6/2007 | Neitzke | 428/411.1 |
| 2009/0065973 A1* | 3/2009 | Jung et al. | 264/254 |
| 2009/0218726 A1* | 9/2009 | Sieverding et al. | 264/255 |

FOREIGN PATENT DOCUMENTS

| | | |
|---|---|---|
| DE | 10 2004 032 362 | 1/2006 |
| DE | 10 2006 016 200 | 10/2007 |
| DE | 10 2006 040 748 | 3/2008 |
| EP | 1 612 024 A1 | 1/2006 |
| WO | WO 00/56524 | 9/2000 |

* cited by examiner

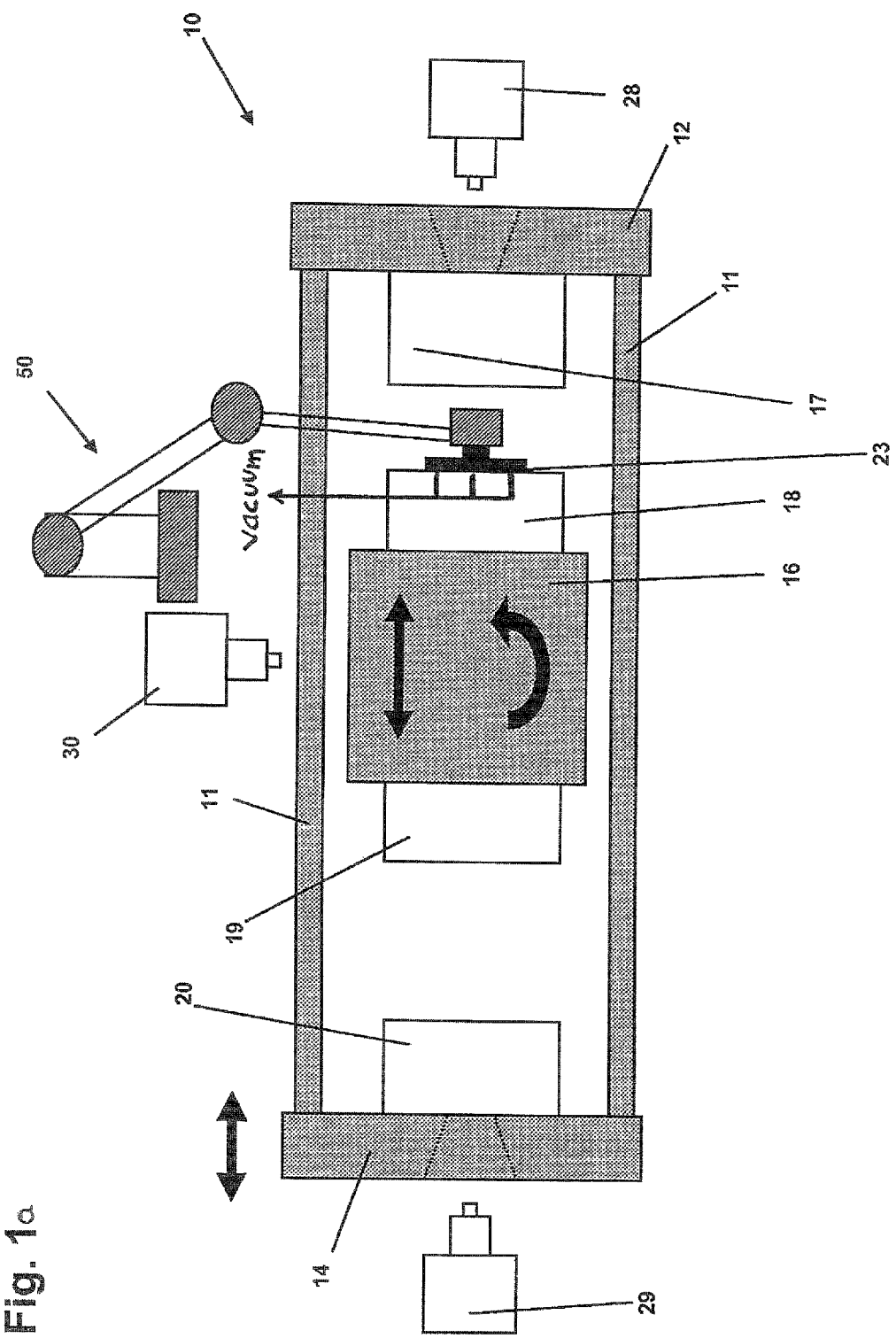

METHOD AND APPARATUS FOR PRODUCING PLASTIC PRODUCTS WITH INTEGRATED REINFORCING STRUCTURE

CROSS-REFERENCES TO RELATED APPLICATIONS

This application is the U.S. National Stage of International Application No. PCT/EP2009/061562, filed Sep. 7, 2009, which designated the United States and has been published as International Publication No. WO 2010/031710 and which claims the priority of German Patent Application, Serial No. 10 2008 047 564.5, filed Sep. 16, 2008, pursuant to 35 U.S.C. 119(a)-(d).

The present invention relates to a method and an apparatus for producing plastic products with integrated reinforcing structure.

BACKGROUND OF THE INVENTION

It is amply known to reinforce plastic products using fibers to meet particular mechanical or physical demands. Plastic products that are especially under stress can be provided with additional reinforcing structures. These reinforcements or functional components become increasingly important, given the continuous trend to provide plastic products of increasingly thinner wall thickness or system plastic products. This trend is based in particular on material-saving needs because material contributes substantially to the production price of a product as costs for raw material rise.

It was already known heretofore to provide certain products with ribs or similar external elements for mechanical reinforcement. It is further known to compression-mold or to shape soaked or impregnated plastic mats with a plastic material and then to subject it to back injection molding.

Furthermore, there is the trend for some time now to use injection molding or extrusion machines to incorporate fibers, especially glass fibers, into the plastic melt in order to enhance the mechanical properties of the entire product. The fiber orientation is oftentimes dependent on the flow behavior in such fiber-laden plastics so that the effective direction cannot be easily predefined. Moreover, the mostly short fiber elements are oftentimes amorphous and randomly arranged in their direction. Therefore, it is not possible to provide reinforcements in particular stress directions. Moreover, injection molding and extrusion applications permit heretofore only the production of limited fiber lengths because the fibers are broken, trimmed, or otherwise cut in the plasticizing device.

Plastic is increasingly used in many high-tech areas that encounter stress peaks only in certain regions or aligned high stress peaks. These products do not necessarily require the presence of reinforcements across the entire product; rather, these parts could be reinforced in some areas only so that the regions that are especially under stress are able to withstand the particular mechanical or physical demands. Still, the reinforcing measures should normally not be visible. Rather, it mostly desired to provide the respective products with same optic and haptic properties across the entire surface.

SUMMARY OF THE INVENTION

It is therefore an object of the present invention, to provide a method and an apparatus for producing plastic products with integrated reinforcing structure to obviate the aforestated drawbacks and to attain the desired properties.

According to one aspect of the invention, the object is attained by a method for producing plastic products with integrated reinforcing structure, using an apparatus, comprised of a multi-cavity clamping unit as well as at least two devices for feeding impregnating material, resin material, or plastic material into a cavity of a mold, to carry out the following steps: depositing and securing a flexible fabric element of fibers or filaments upon a mold surface of a first half-mold of a mold, associating a second half-mold of a mold to the first half-mold and closing the thus-established first mold to define a first cavity; introducing a first plastic or impregnating material into the first cavity to form a first layer, opening the first mold after the first layer has at least cured in part, with the fabric element forming a first intermediate product, which is coated with plastic or impregnated, staying on the first half-mold of the mold associating a third half-mold of a mold to the first half-mold of a mold and closing the thus-established second mold to define a cavity which in relation to the fabric is positioned in opposition to the layer applied first, introducing a further plastic material into this cavity to form a second layer, opening the second mold after the second layer has at least cured in part, and removing the thus-produced product.

According to another aspect of the invention, the object is attained by an apparatus having at least three half-molds for establishing at least two molds with different cavities, a clamping unit for receiving, for changing association of the various half-molds, and for applying a clamping force for each mold, at least two devices for introducing plastic, resin, or impregnating materials into the cavities, and a depositing device for placing a flexible fabric onto the cavity surface of a half-mold.

Accordingly, it is a core idea of the present invention to apply initially a flexible fabric (generally textile) onto the cavity surface of a mold. Subsequently, various combinations of the half-molds and formation of molds result in the realization of layers, especially plastic layers, on both sides of this fabric. Overall, a cost-efficient and rapid production of a plastic product with sandwich construction can be realized in a simple manner with a single apparatus in which a fabric (especially textile fabric) is embedded in at least two layers and which ensures a respective reinforcement.

According to a particularly preferred embodiment, an impregnating agent can be introduced as first material to fully permeate the textile reinforcing structure and to ensure an entire impregnation. Further layers are then applied incrementally on the thus-produced (intermediate) product. When applying two further plastic layers on both sides of the thus impregnated reinforcing textile, a sandwich product is realized having a fully impregnated reinforcing textile in one operating step. To date, it was required to produce in a first separate step a product provided with a respective impregnation of matrix, and then to place the product in a second separate operating step—if necessary after a shaping step—in an injection molding machine and to mold around it.

According to a further advantageous embodiment, it is moreover possible to coat a plastic layer or the impregnation layer in a further process step with a surface layer, resin layer, or varnish layer so as to realize a thin coating or finish.

Preferably, a plastic material for a layer is made and introduced by means of an extrusion or injection molding process; According to the invention, this is implemented on the same apparatus which may optionally be configured as sliding table, rotary table, or reversing plate machine.

As an alternative, the plastic material may also be made or introduced by a reaction injection molding process, for example with polyurethane or another thermoset.

When depositing the fabric structure, only particular regions of the plastic product may also be selected. As a result, the formation of reinforcing structures in some areas is possible. When providing an impregnation in a first coating step, such a local reinforcement renders possible the impregnation of the fabric surfaces only. Overall, reinforcing zones of higher, smaller or even no reinforcing zones at all may be formed within the plastic product.

Prior to each application of a layer, functional elements may be applied onto the (intermediate) product formed beforehand. After application of at least the last layer, these functional elements are then integrated in the plastic product.

In this way, separate devices such as sensors, lamps, actuators, can be used or other functional elements can be configured integrally with the reinforcing structure. For example, metallic filaments can be incorporated into the reinforcing structure to attain a conducting function in dependence on physical conditions and to detect a crack or fracture for example or also to sense another load—such as a strain.

Further advantages and features are set forth in the patent claims.

BRIEF DESCRIPTION OF THE DRAWING

Various exemplary embodiments of the present invention will now be described in greater detail with reference to the attached drawings. The drawings show in FIG. 1 a schematic illustration of a concrete embodiment of a machine according to the invention for carrying out the method according to the invention, FIG. 1a a schematic illustration of one variation of the machine of FIG. 1 equipped with a vacuum means to hold a flexible fabric on a cavity surface, FIG. 1b a schematic illustration of another variation of the machine of FIG. 1 with adhesive applied to hold a flexible fabric on a cavity surface, FIG. 2 a schematic illustration like FIG. 1 but in a second opened process state of the machine, FIG. 3 a schematic illustration like FIG. 1 but in a third process state of the machine, FIG. 4 a schematic illustration like FIG. 1 but in a fourth process state of the machine, FIG. 5 a schematic illustration like FIG. 1 but in a fifth process state of the machine, FIG. 6 a schematic illustration like FIG. 1 but in a sixth process state of the machine, FIG. 7 a schematic illustration like FIG. 1 but in a seventh process state of the machine, FIG. 8 a schematic illustration like FIG. 1 but in a eighth process state of the machine, and FIG. 9 a schematic illustration like FIG. 1 but in a ninth process state of the machine,

DETAILED DESCRIPTION OF PREFERRED EMBODIMENTS

Figure 1B:
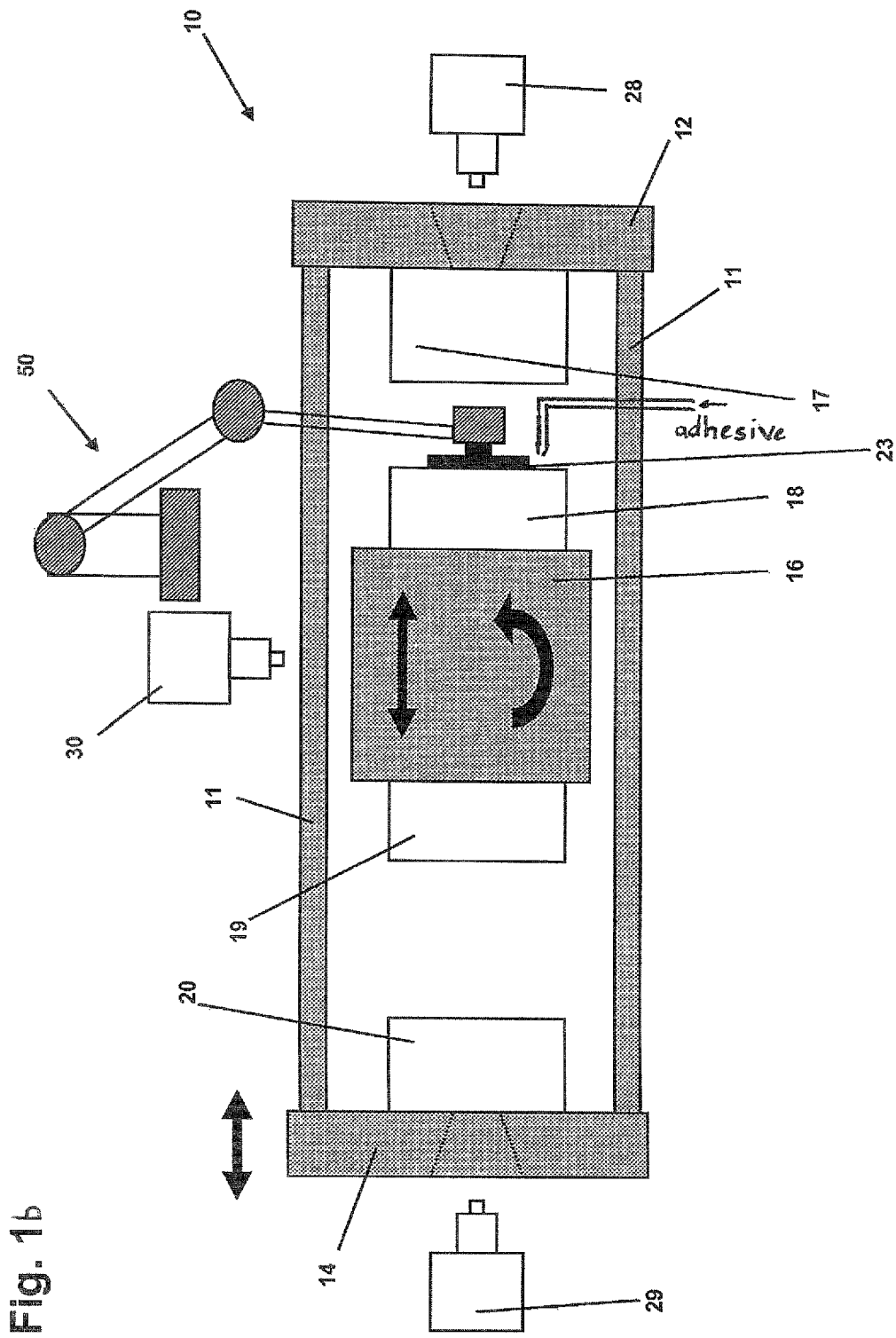

A concrete embodiment of an apparatus according to the invention for carrying out the method according to the invention will now be described with reference to FIGS. 1 to 9. A clamping unit 10 can be seen which has a fixed platen 12 and a moving platen 14 (mobility see double arrow) which are connected to one another via tie bars 11. An approximately cubic reversing plate 16 is arranged on a turntable (not shown) between both platens 12 and 14 and is movable jointly with the not shown turntable also in the direction of the moving platen and in addition rotatably arranged (cf. arrows).

The fixed platen 12 and the moving platen 14 have arranged thereon half-molds 17 and 20, respectively which—as will be disclosed hereinafter—differ as far as their cavity space is concerned. Moreover, further half-molds 18 and 19 are mounted on opposite sides of the reversing plate 16. Also these half-molds are differently configured. The half-mold 17 can hereby define with the half-molds 18 and 19, respectively, a mold (first and second molds). Moreover, the half-mold 20 may also define with the half-mold 19 a mold (third mold). As an alternative, the clamping unit may, of course, also be designed as sliding table clamping unit or rotary table clamping unit for example. Important is only that three or more cavities can be established.

Plasticizing and injection units 28 and 29 (shown only schematically) are arranged in the area of the fixed and moving platens 12 and 14 and can be docked to the respective molds via respective funnels. A further plasticizing and injection unit 30 is additionally provided which is arranged as so-called "bolt-on-unit" to the side (also above as an alternative) of the clamping unit and—at least in one position can be docked directly to the reversing plate 16 from where the melt can be routed via respective channels via one of the half-molds into a cavity. As an alternative, it is also possible to configure the clamping unit, provided as "bolt-on-unit" for docking directly to a half-mold (e.g. half-mold 19).

In a manner known per se, the plasticizing and injection units 28 to 30 can be used to inject plastic melt into the cavity of a pertaining mold.

As an alternative, it is also possible to provide, instead of a plasticizing and injection unit, another feed unit for a plastic, resin, impregnating agent, varnish, thermoplastic material or thermoset, as will be clear hereinafter.

FIGS. 1 to 9 further show the presence of a device 50 for introduction of a flexible fabric (generally textile) into the clamping unit. This device 50 includes a robotic arm having an arm end for arrangement of a pick-up unit for grabbing the flexible fabric (textile). The robotic arm is able to grab a flexible fabric (textile) and to place it on the cavity surface of a half-mold (here half-mold 18), when the clamping unit is open.

The mode of operation of the afore-described embodiment is as follows:

At the beginning of the process cycle described here, the clamping unit 10 of the injection molding machine is open, as shown in FIG. 1, the half-mold 18 is associated to the half-mold 17, and the half-mold 19 is associated to the half-mold 20. The respective plasticizing and injection units 28 to 30 are withdrawn from the molds.

The robotic arm 50 picks up a flexible fabric (textile) 23 which may involve a fabric, non-woven, knitted fabric, interlaced fabric, weaved fabric, or like textile composites formed there from, and places it on the cavity surface of the mold 18. For that, means are provided to hold the flexible fabric (textile) 23 on the cavity surface of the half-mold 18. This may be vacuum means for example, as indicated in FIG. 1a. As an alternative, the flexible fabric (textile) 23 may be held by an adhesive or boding agent on the cavity surface of the half-mold 18, as indicated in FIG. 1b. The cavity surface may optionally also be wetted with bonding agent or provided with suitable mechanical receiving elements in order to secure the flexible fabric (textile).

Figure 2:
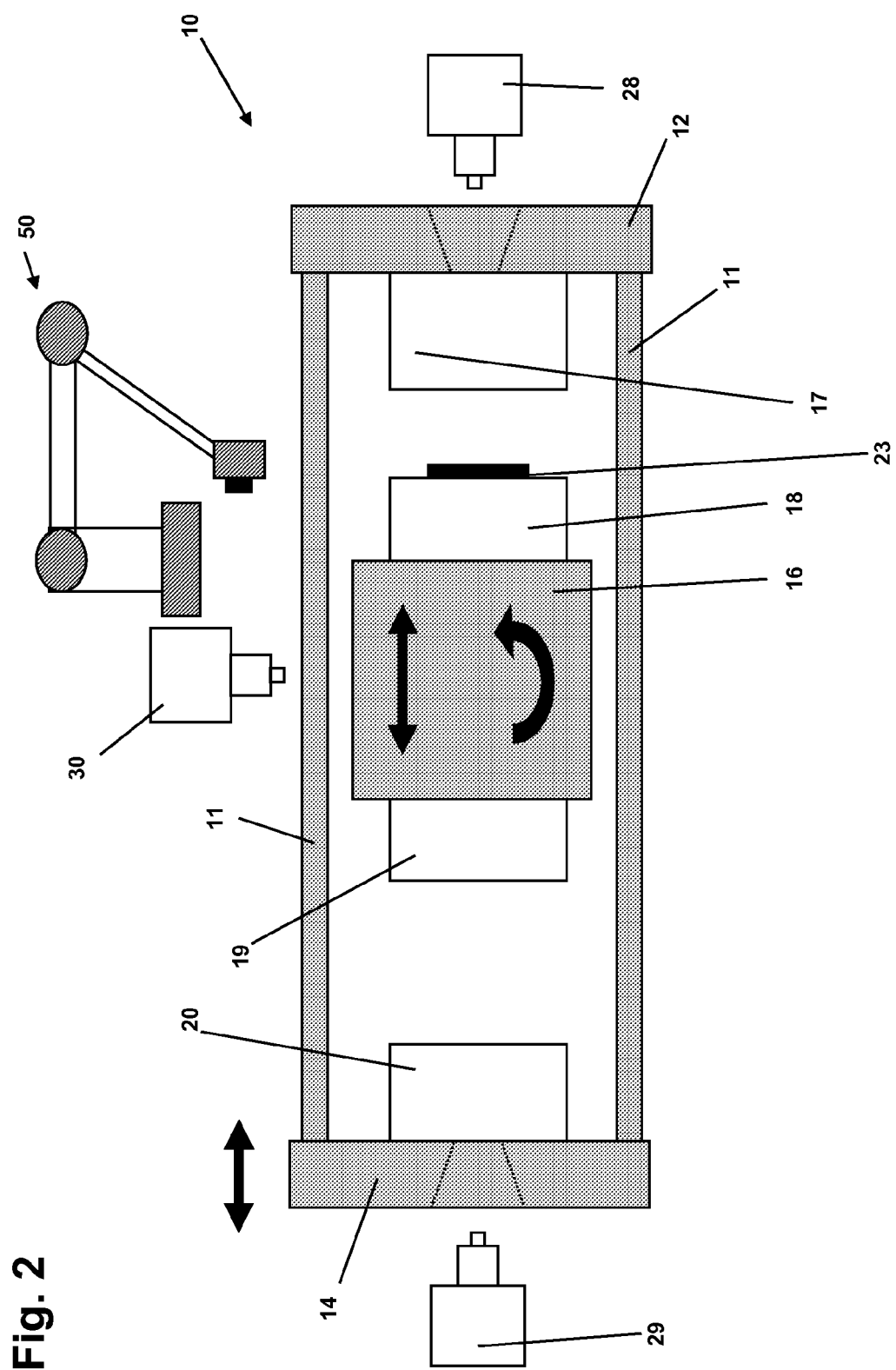
Figure 3:
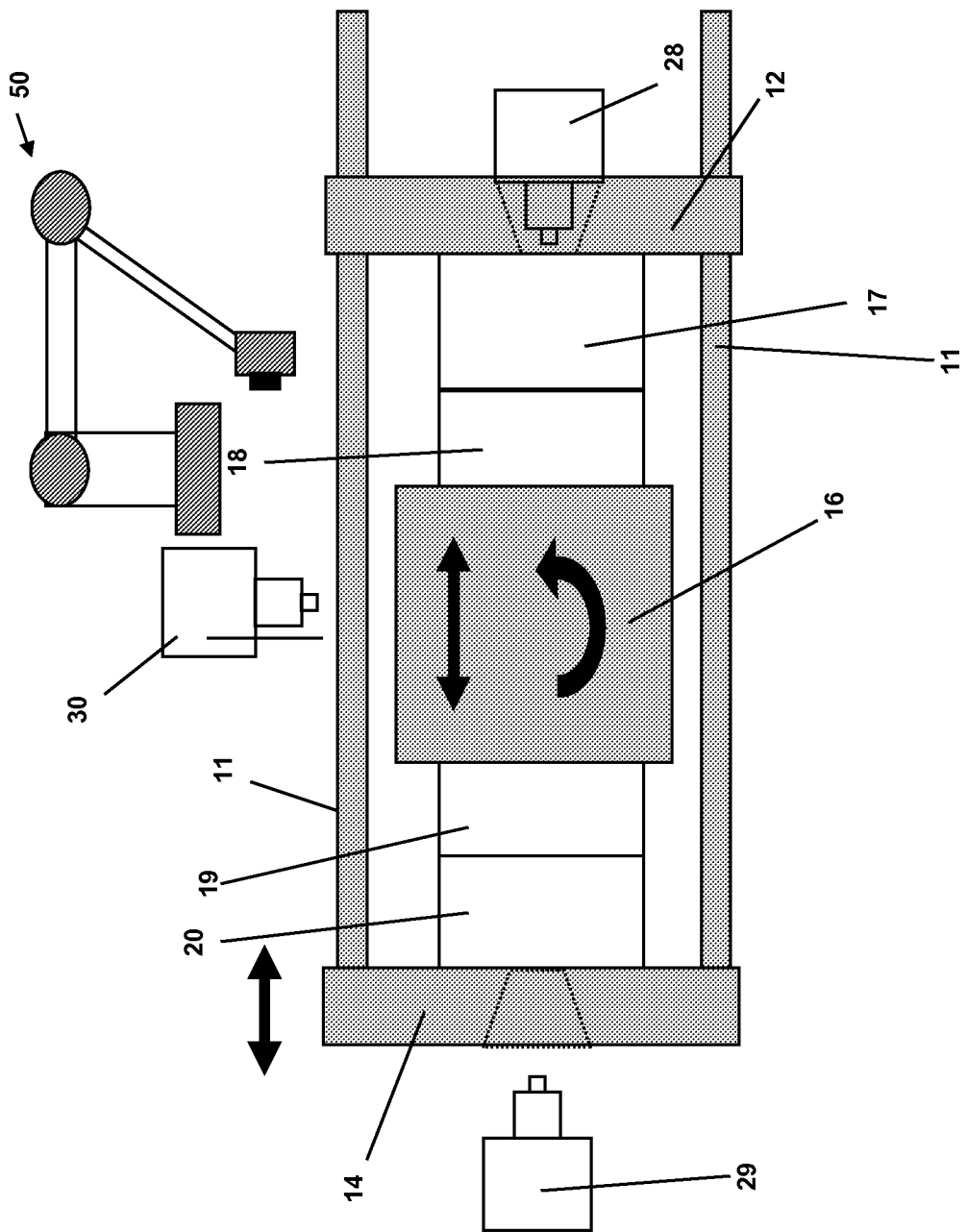

After introduction of the flexible fabric (textile), the robotic arm 50 is retracted from the clamping unit, in particular from the space between the two half-molds 17 and 18—as depicted in FIG. 2, and the clamping unit 10 is closed (cf. FIG. 3). As a result, the half-molds 17 and 18 form a first mold in which a cavity is established which is configured essentially on the side of the mold 17 in relation to the flexible fabric (textile) 23.

The plasticizing and injection unit 28 is docked onto the first mold and a first plastic material is injected into the cavity. This first plastic material 24 substantially covers the flexible fabric (textile) 23 on one side—or in other words, the flexible fabric (textile) 23 bears upon a surface of the thus-produced product. It is, of course, possible to arrange the flexible fabric (textile) 23 on selected sites only so that the surface of the thus produced product is provided with the fabric textile only in some areas.

Figure 4:
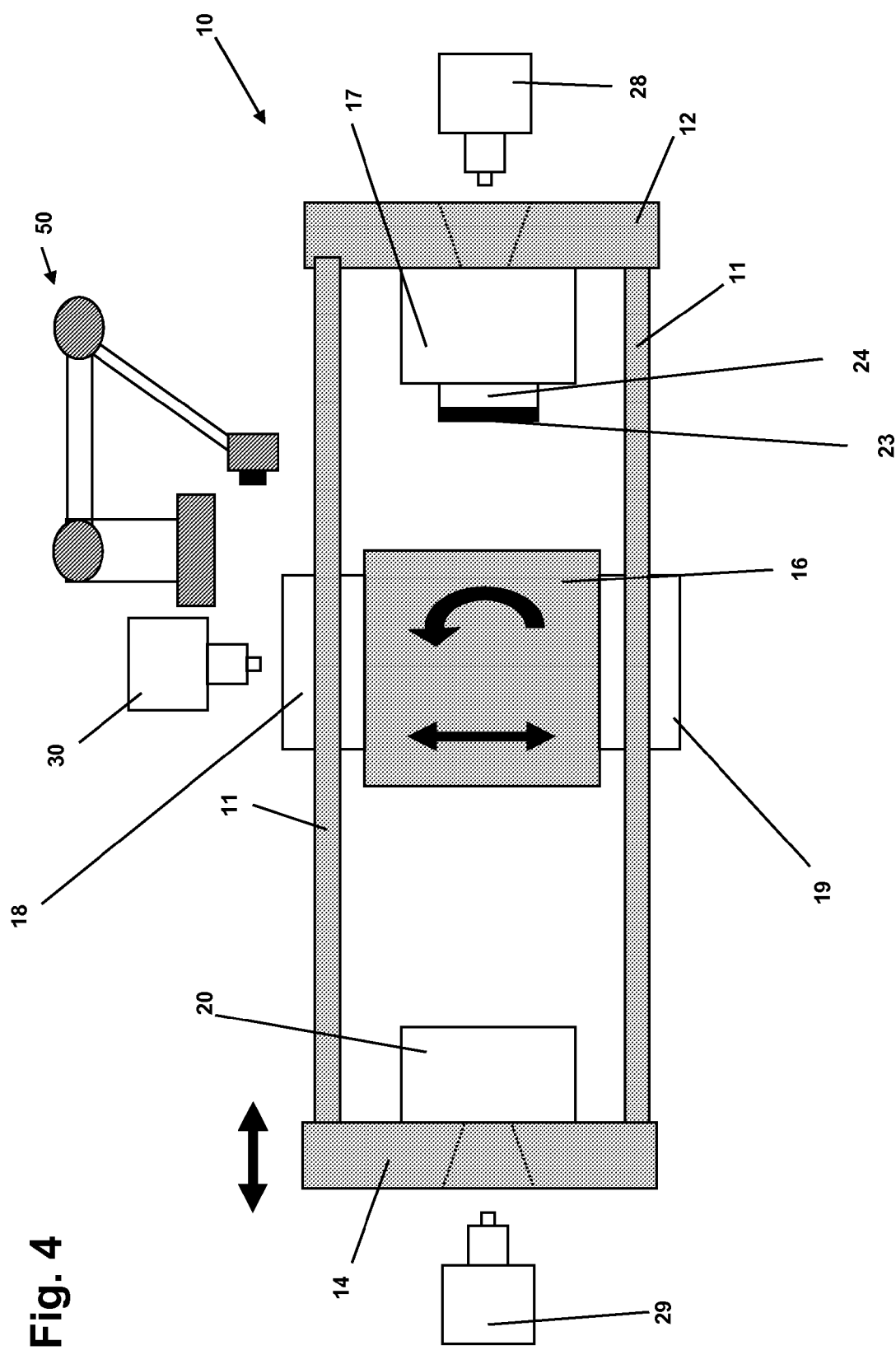
Figure 5:
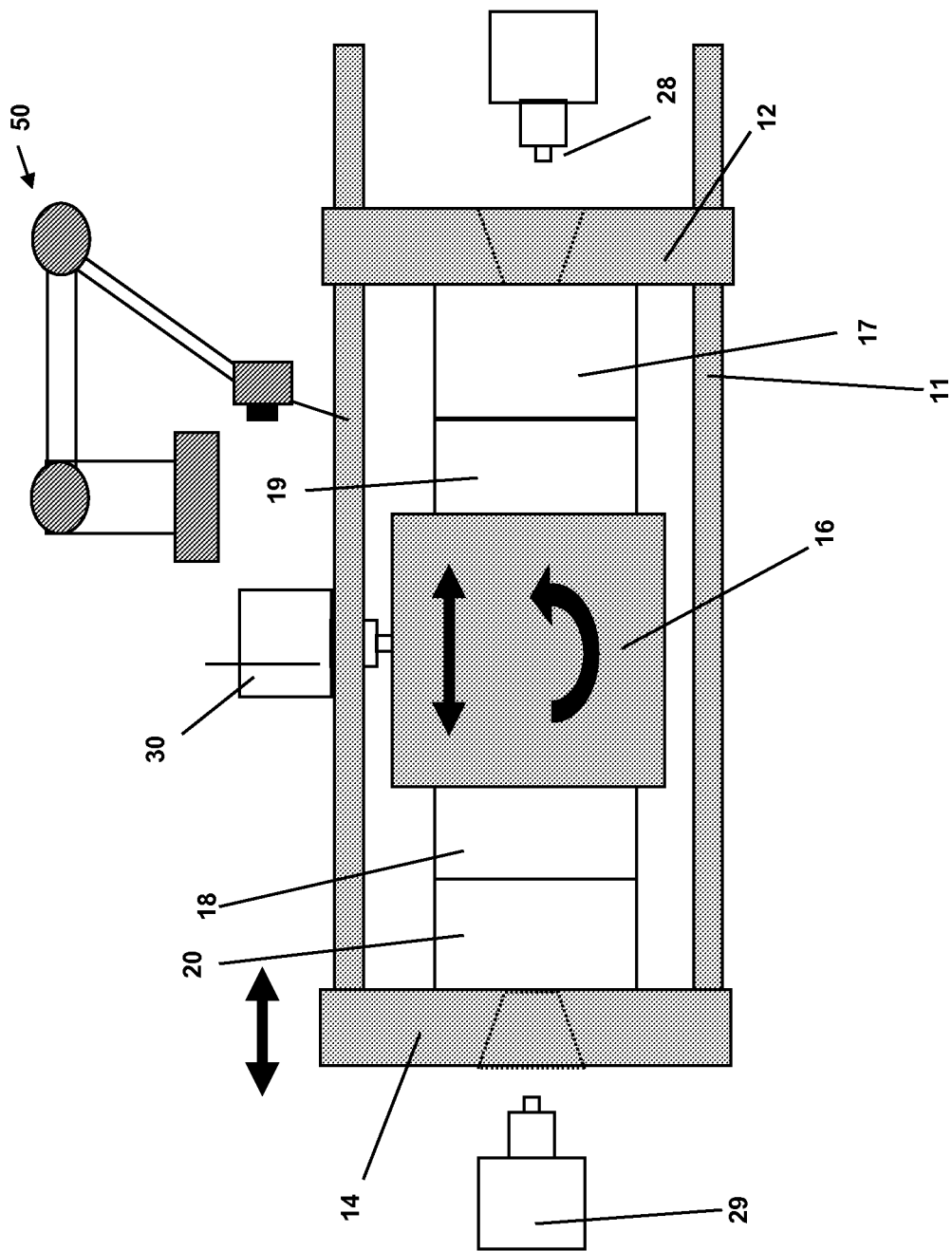
Figure 6:
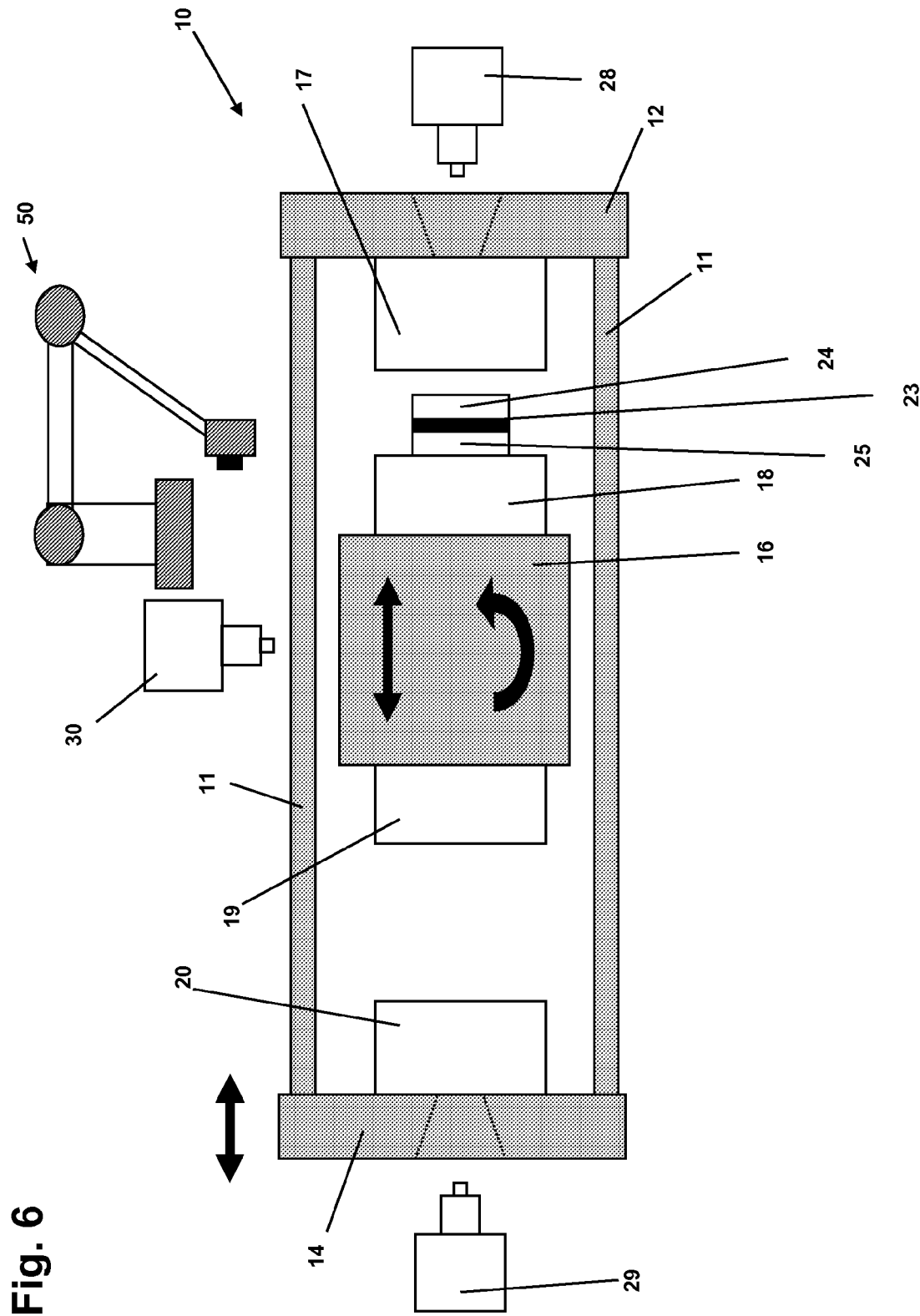
Figure 7:
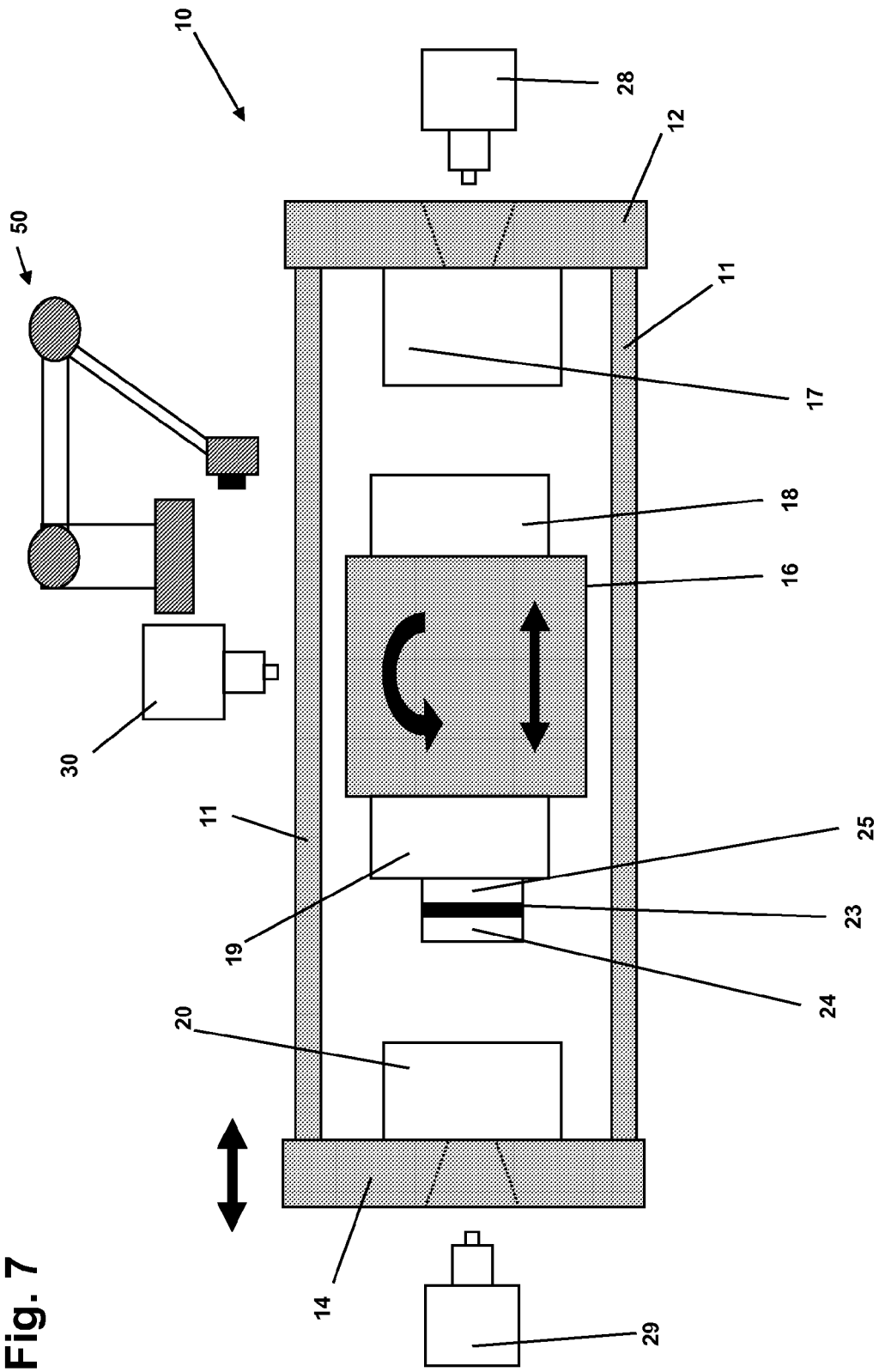
Figure 8:
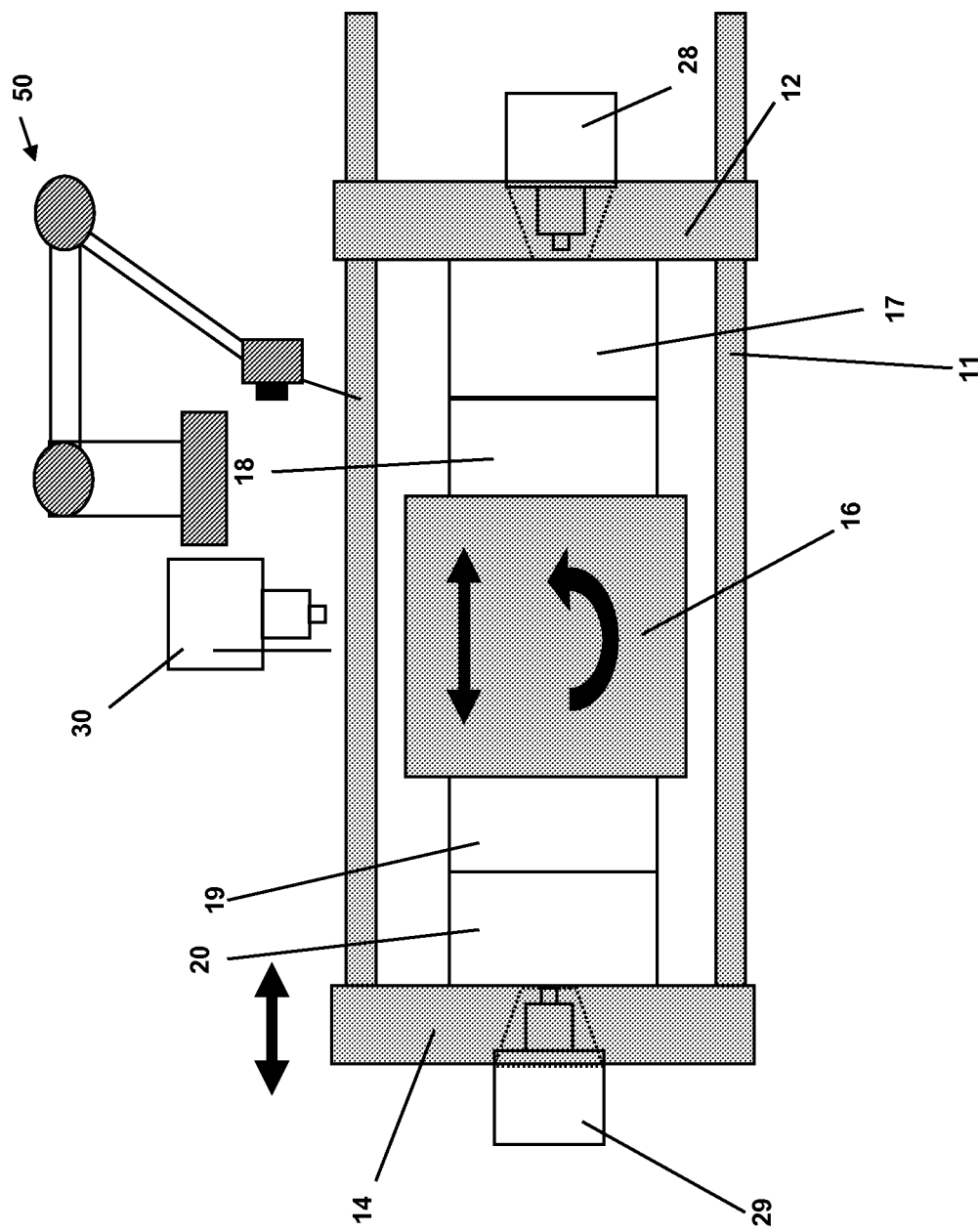
Figure 9:
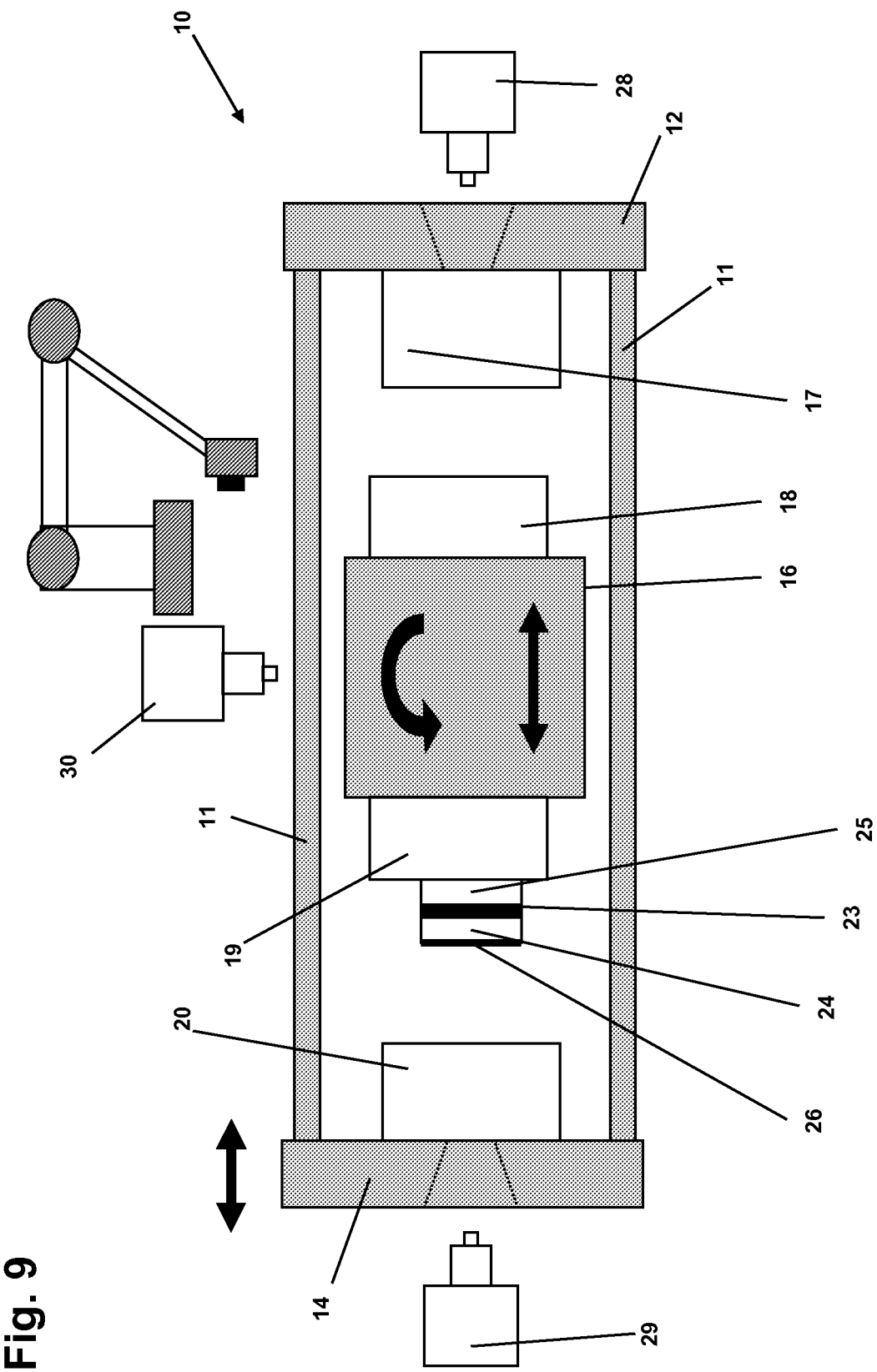

Subsequently, the clamping unit is opened again, as shown in FIG. 4, with the intermediate product of the fabric (textile) 23 made in the first step (no longer flexible now) and the first plastic material 24 staying on the half-mold 17.

Subsequently—as also hinted in FIG. 4—the reversing plate 16 is turned by 180° to associate the half-mold 19 to the half-mold 17. Then, the clamping unit is closed again (cf. FIG. 5), thereby establishing a cavity with regard to the previously produced intermediate product on the side of the half-mold 19. The plasticizing and injection unit 30 injects into this cavity a second plastic material which is conducted via the reversing plate 16 and the half-mold 19. As an alternative, the plasticizing and injection unit 30 could also be docked directly onto the half-mold 19.

After the second plastic material 25 has cured at least in part, the clamping unit 10 is opened again, with the thus produced intermediate product remaining on the half-mold 19. As a result, a plastic product is created in which the fabric 23 is sandwiched between the layers formed by the first plastic material 24 and the second plastic material 25. The illustration of FIG. 6 should be considered only very schematically as the fabric (textile) can no longer be recognized in the product. Rather, it is fully enveloped by the different layers. The fabric (textile) may hereby be embedded substantially across the entire surface or only integrated in part, depending on the desires of the user or on the demands to be met by the product. The first and second plastic materials may be identical or also different.

According to a simplified embodiment, the production may be concluded at this point and the product transferred for further processing.

In the present embodiment however, the reversing plate 16 is turned again so that the currently produced intermediate product, comprised of the layers 23 to 25, is associated together with the half-mold 19 to the half-mold 20 (cf. FIG. 7) After closing the clamping unit 10, the half-molds 19 and 20 form a third mold having a cavity which is arranged on the side of the mold 20 adjacent to the intermediate product. Docking the plasticizing and injection unit 29 and introducing a third plastic material forms a coat (cf. reference numeral 26 in FIG. 9) having defined surface properties.

After undergoing at least partial curing and opening, the finished product can then be removed.

Further alternatives are realized through slight modifications of the embodiment illustrated in FIGS. 1 to 9 within the scope of the invention.

According to a particularly preferred variation, the plasticizing and injection unit 28 is replaced for example by an injection device for an impregnating agent. When injecting a highly viscous plastic material in a first step, it is conceivable that the fabric material (reinforcing textile) has not fully permeated the material and still has a flexible core. The reinforcement effect is thus impaired. In order to realize a complete permeation, a first step may involve impregnation in which essentially the flexible fabric material (reinforcing textile) 23 is fully impregnated in the respectively small cavity of the first mold—comprised of the half-molds 17 and 18. Subsequently, the following steps involve, as described above, the application of two further plastic materials so that the thus-produced product has now an impregnated fabric (textile) sandwiched between two plastic layers. This results in a superior reinforcement (in all areas or some areas).

Further, instead of one or more plasticizing and injection units 28 to 30, polyurethane mixing heads may be provided so that a thermoset, instead of a thermoplastic, is introduced into the cavity. This is especially of interest when a surface coating (e.g. the layer 26) is demanded with specially desired properties (haptic, light-fastness, etc.).

It is also possible to provide a varnish as surface material so as to remove a varnished product (varnish layer would then also be the layer 26).

Especially when the first layer is configured as impregnation, as described further above, it may be desirable as a departure from the embodiment in FIGS. 1 to 9, to be able to form a fourth mold in order to realize also a varnishing in addition to a first impregnation layer, a second plastic layer, and a third plastic layer. As can be seen, there is a wide range of applications of the present invention.

Besides the fabric material (reinforcing textile), each process step may involve the application of further functional elements such as sensors or the like on a surface of the intermediate product. These functional elements are then cast in a following process step so as to form an integral part of the product. Also the fabric, knitted fabric or non-woven (generally reinforcing textile) may have areas with metal filaments or similar element which later can be operated (used) as actuator or sensor.

Of course, a number of further processing devices may be provided to implement coatings, layers, treatments etc. in the various process sections.

The present invention permits the introduction of the reinforcing structures in plastic products in numerous design variations so as to be able to provide thin components or components that are under great stress in particular with the desired mechanical, thermal, physical or other properties. Also, respective functional elements can be integrated which may be necessary in the area of the reinforcing structure.

The invention claimed is:

1. A method for producing a plastic product with integrated reinforcing structure, comprising the steps of:
providing a clamping unit having at least three half-molds, two platens and an intermediate and reversing plate arranged between the two platens and rotatable about an axis;
securing a flexible fabric element of fibers or filaments upon a mold surface of a half-mold of two half-molds of a first mold in a working area between a first one of the platens and the intermediate and reversing plate;
closing the first mold to define a first cavity;
introducing a first plastic material into the first cavity in the same working area between the first platen and the intermediate and reversing plate to form a first layer only on one side of the fabric element and curing the first layer at least in part;
opening the first mold after the first layer has at least cured in part only on the one side of the fabric element, with the fabric element staying on one of the half-molds of the first mold;
positioning a third half-mold in opposition to the one half-mold with adhering fabric element to define a second mold;

closing the second mold to define a second cavity which opposes the first layer;

introducing a further plastic material into the second cavity in the same working area between the first platen and the intermediate and reversing plate to form a second layer only on another side of the flexible fabric element and curing the second layer at least in part;

opening the second mold after the second layer has at least cured in part only on the other side of the fabric element.

2. The method of claim 1, wherein the product remains on one of the first and third half-molds of the second mold after formation of the second layer and opening of the second mold, and further comprising the steps of:

positioning a fourth half-mold in opposition to the one of the first and third half-molds with adhering product to define a third mold;

closing the third mold to define a third cavity adjacent to the first and second layers; and introducing a material selected from the group of plastic material, resin, and varnish material to apply a third layer on the product in the third cavity.

3. The method of claim 2, wherein at least one of the first, second and third layer is produced and introduced by injection molding process.

4. The method of claim 2, wherein at least one of the first, second and third layer is produced and introduced by reaction injection molding process.

5. The method of claim 1, wherein the flexible fabric element is formed from at least one of a fabric, non-woven, interlaced fabric, and knitted fabric.

6. The method of claim 2, further comprising the step of applying a bonding agent before applying any one of the first, second or third layers.

7. The method of claim 2, further comprising the step of applying a functional element prior to, simultaneously with, or after application of any one of the first, second or third layers.

* * * * *